(12) United States Patent
Seo et al.

(10) Patent No.: US 7,625,693 B2
(45) Date of Patent: Dec. 1, 2009

(54) METHOD OF FABRICATING ONE-WAY TRANSPARENT OPTICAL SYSTEM

(75) Inventors: O-gweon Seo, Yongin-si (KR); Kae-dong Back, Yongin-si (KR); Chang-seung Lee, Yongin-si (KR); Kyu-sik Kim, Suwon-si (KR); Duck-su Kim, Suwon-si (KR); Byoung-ho Cheong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 589 days.

(21) Appl. No.: 11/295,636

(22) Filed: Dec. 7, 2005

(65) Prior Publication Data
US 2006/0134533 A1 Jun. 22, 2006

(30) Foreign Application Priority Data
Dec. 7, 2004 (KR) ............. 10-2004-0102211

(51) Int. Cl.
*G03F 1/00* (2006.01)
(52) U.S. Cl. .................. 430/322; 430/321; 430/5; 359/237

(58) Field of Classification Search .............. 430/5, 430/22, 311, 321–324; 359/237, 242
See application file for complete search history.

(56) References Cited

U.S. PATENT DOCUMENTS 4,830,941 A * 5/1989 Roosen et al. ........... 430/287.1
6,639,705 B2 * 10/2003 Hira ........................ 359/237

* cited by examiner

*Primary Examiner*—Mark F Huff
*Assistant Examiner*—Stewart A Fraser
(74) *Attorney, Agent, or Firm*—Sughrue Mion, PLLC

(57) ABSTRACT

A method of fabricating a one-way transparent optical system by which external light is effectively intercepted and internal light passes nearly without loss is provided. The method includes: forming a silver halide on a transparent substrate; aligning a mask in which a predetermined pattern is formed, on the transparent substrate and exposing the silver halide using the mask; developing and fixing the exposed silver halide and forming a plurality of light-absorbing materials on the transparent substrate; and forming protrusion structures having a shape of a convex lens shape for refracting incident light toward a corresponding light-absorbing material of the light-absorbing materials, on the transparent substrate on which the light-absorbing materials are formed.

14 Claims, 5 Drawing Sheets

METHOD OF FABRICATING ONE-WAY TRANSPARENT OPTICAL SYSTEM

CROSS-REFERENCE TO RELATED PATENT APPLICATIONS

This application claims priority from Korean Patent Application No. 10-2004-0102211, filed on Dec. 7, 2004, in the Korean Intellectual Property Office, the disclosure of which is incorporated herein in its entirety by reference.

BACKGROUND OF THE INVENTION

1. Field of the Invention

The present invention relates to a method of fabricating a one-way transparent optical system and, more particularly, to a method of fabricating a one-way transparent optical system by which external light is effectively intercepted and internal light passes nearly without loss.

2. Description of the Related Art

When using an emissive type display device such as an organic electroluminescent (EL), external light is reflected on the surface of the display device so that glare occurs and contrast decreases due to the external light reflected by a metallic electrode. To prevent these problems, in the prior art, an antireflective coating, a polarizer, and a ¼ waveplate, as shown in FIG. 1, have been used. That is, reflection of external light 20 on the surface of the display device is minimized using an antireflective coating, thereby preventing glare. A polarizer 12 and a ¼ waveplate 11 are formed on the surface of the display device and suppress re-emission of external light incident into the display device, thereby preventing a decrease in contrast. That is, as shown in FIG. 1, the external light 20 that has passed through the polarizer 12 has only linear polarization components. The external light 20 having only linear polarization components is changed into circular polarization by the ¼ polarization plate 11, and thus does not pass through the polarizer 12 during reflection. Thus, re-emission of external light incident into the display device is suppressed.

However, in the prior art, due to the ¼ waveplate 11 and the polarizer 12, emission of internal light as well as external light is limited so that only about 50% more internal light can be emitted from the inside of the display device. Thus, in a conventional structure for preventing glare and a decrease in contrast, optical efficiency and brightness of the display device are decreased.

FIG. 2 shows an organic electroluminescent (EL) element having a glare-preventing structure using a light-absorbing material, instead of a polarizer. Referring to FIG. 2, in the organic EL element in which a first electrode 22, a hole injecting layer 23, a hole transporting layer (HTL) 24, an organic light-emitting layer 25, an electron transporting layer 26, an electron injecting layer 28, and a second electrode 29 are consecutively stacked on a transparent substrate 21, the electron transporting layer 26 is doped with a light-absorbing material. However, in this structure, since internal light generated in the organic light-emitting layer 25 is also absorbed by the light-absorbing material, only the effects of reducing manufacturing costs are achieved, unlike a structure using a polarizer.

FIG. 3 illustrates a structure of a display device for preventing glare using extinguishment interference. Referring to FIG. 3, the display device has a structure in which a light-emitting layer 32, a second electrode 33, a top protective layer 34 and an antireflective coating layer 35 are consecutively stacked on a first electrode 31. In addition, the first electrode 31 includes a semi-transmission layer 31a, a transmission layer 31b, and a total reflection layer 31c. In this structure, a part L1 of external light is not reflected by the antireflective coating layer 35 but absorbed. Part L2 of light L2 and L3 that have passed through the antireflective coating layer 35 is reflected by the semi-transmission layer 31a and the other part L3 thereof is reflected by the total reflection layer 31c. In this case, light L2 reflected by the semi-transmission layer 31a and light L3 reflected by the total reflection layer 31c interfere with each other and are extinguished. However, even in this structure, since part of internal light generated in the light-emitting layer 32 is reflected by the semi-transmission layer 31a and the total reflection layer 31c and extinguished, internal light also decreases.

SUMMARY OF THE INVENTION

The present invention provides a method of fabricating a one-way transparent optical system by which external light is effectively intercepted and internal light passes nearly without loss.

The present invention also provides a method of fabricating a one-way transparent optical system by which glare and a decrease in contrast do not occur and brightness is high.

The present invention also provides a method for fabricating the one-way transparent optical system simply and at low costs.

According to an aspect of the present invention, there is provided a method of fabricating a one-way transparent optical system, the method including: forming a silver halide on a transparent substrate; aligning a mask in which a predetermined pattern is formed, on the transparent substrate and exposing the silver halide using the mask; developing and fixing the exposed silver halide and forming a plurality of light-absorbing materials on the transparent substrate; and forming protrusion structures having, for example, a shape of a convex lens for refracting incident light toward a corresponding light-absorbing material of the light-absorbing materials, on the transparent substrate on which the light-absorbing materials are formed.

The silver halide may include at least one of silver bromide (AgBr) or silver chloride (AgCl).

The forming of the silver halide on the transparent substrate may be performed by mixing the silver halide with gelatine emulsion and coating its mixture on the transparent substrate.

The forming of the plurality of light-absorbing materials on the transparent substrate may include: developing step of reducing the light-exposed silver halide into black metallic silver using a developer; fixing step of converting an unexposed silver halide into silver salts using a fixer; and cleaning, eliminating and drying the remaining developer, the fixer, and the silver salts. Before the fixing step, the method may further include neutralizing the remaining alkaline developer using acid chemicals. Then, the reduced black metallic silver serves as a light-absorbing material.

The forming of the protrusion structures having a convex lens shape may include: stacking a transparent optical material on the transparent substrate on which the light-absorbing materials are formed; patterning the transparent optical material to form a plurality of protrusion structures; and melting and cooling the patterned protrusion structures to form protrusion structures having a convex lens shape.

In this case, a refractive index of the transparent optical material may be substantially the same as a refractive index of the transparent substrate.

A light transmission layer and an antireflective layer may be additionally and consecutively formed on the protrusion structures. In this case, the refractive index of the light transmission layer may be lower than refractive indices of the protrusion structures.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF ILLUSTRATIVE, NON-LIMITING EMBODIMENTS OF THE INVENTION

Figure 1:
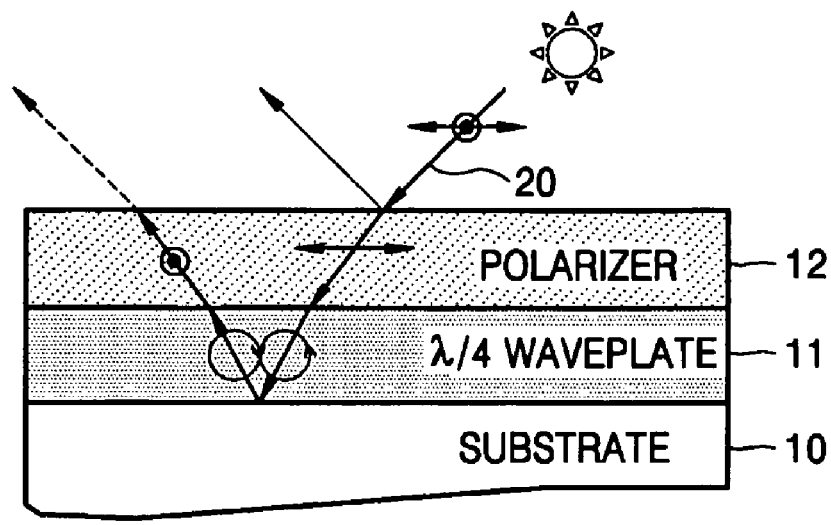
FIG. 1 schematically illustrates a conventional structure for preventing glare.
Figure 2:
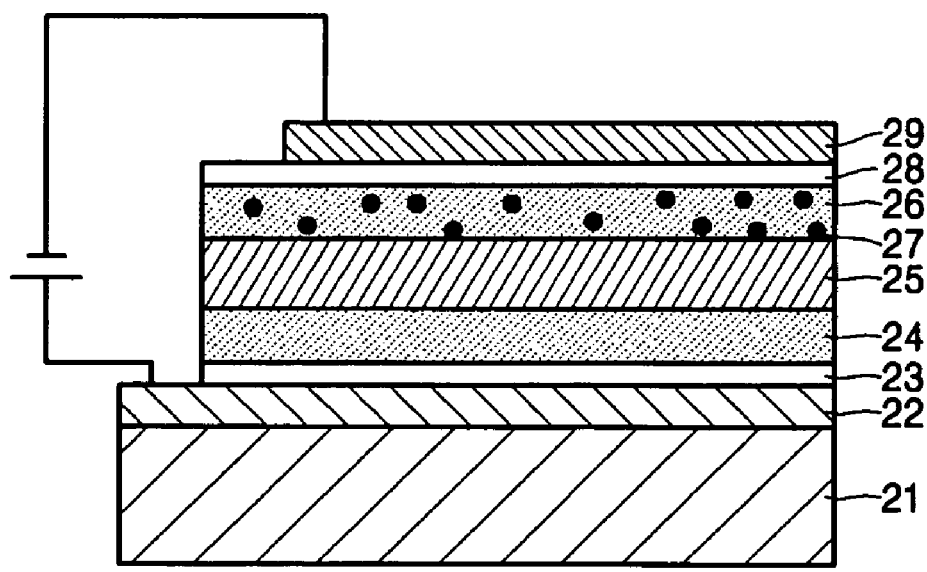
FIG. 2 is a schematic cross-sectional view of the conventional structure for preventing glare using a light-absorbing material.
Figure 3:
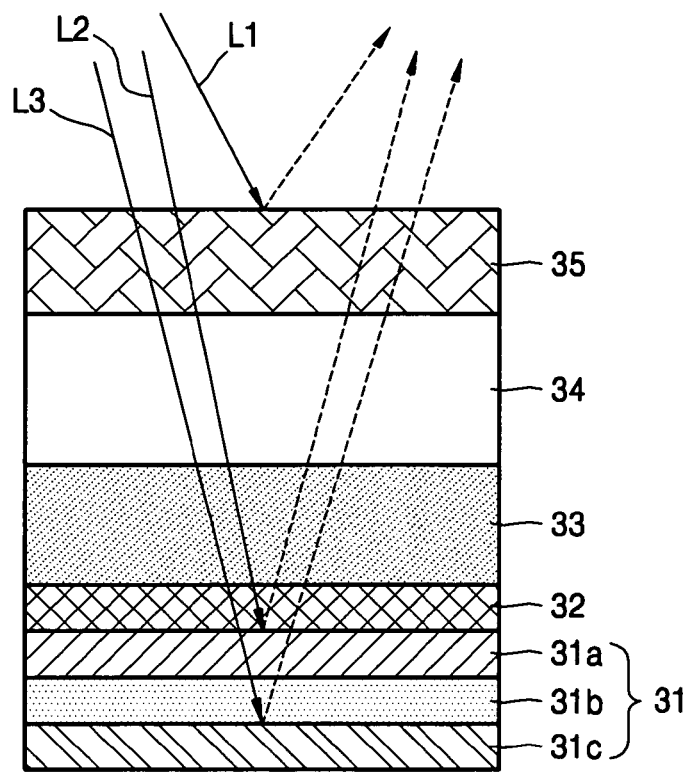
FIG. 3 illustrates a structure of a display device for preventing glare using extinguishment interference.
Figure 4:
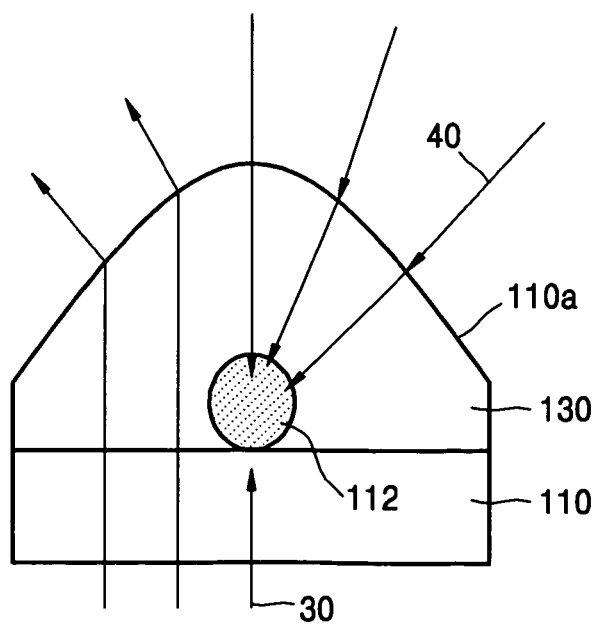
FIG. 4 illustrates a basic structure of a one-way transparent optical system according to an embodiment of the present invention.

FIG. 4 is a cross-sectional view schematically illustrating a structure of a one-way transparent optical system according to an exemplary embodiment of the present invention. Referring to FIG. 4, a transparent optical material 130 is formed on a transparent substrate 110 such as a transparent film. A light-absorbing material 112 is buried in the transparent optical material 130, and a protrusion structure 110a is formed on an upper surface of the transparent optical material 130. The protrusion structure 110a has substantially the shape of a convex lens. However, the protrusion structure 110a may have different shapes such as hemispherical, spheroid, polygonal shapes and the like. The light-absorbing material 112 may be formed by exposing silver halide (AgX). The light-absorbing material 112 is disposed near a focusing area of the protrusion structure 110a. Thus, external light 40 incident from the outside is refracted by the protrusion structure 110a having the shape of a convex lens and aimed at the light-absorbing material 112 disposed near the focusing region of the protrusion structure 110a. After that, external light 40 is absorbed by the light-absorbing material 112. In this case, the protrusion structure 110a may have a hemispherical shape, for example, so that external light 40 having a wide incident angle can be refracted toward a substantially small focusing region.

Internal light 30 generated in a display device (not shown) disposed below the transparent substrate 110 proceeds in a direction opposite to the external light 40. The internal light 30 may be image light, for example, and the display device may be a plasma display panel, an organic EL display or different display device. Referring to FIG. 4, the light-absorbing material 112 has a small horizontal cross-section. Thus, most internal light 30 generated in a light-emitting layer is not absorbed into the light-absorbing material 112 but passes through the transparent substrate 110 without loss and is emitted. Only a very small part of the internal light 30 collides with the light-absorbing material 112 and is absorbed thereinto.

According to an exemplary embodiment of the present invention, the protrusion structure 110a may have a diameter of about 0.1 to 100 μm, preferably, 1 to 10 μm. In another embodiment of the present invention, the protrusion structure 110a has a diameter of about 3 to 10 μm. The diameter of the light-absorbing material 112 may be half of the diameter of the protrusion structure 110a at the maximum. For balance of the external light 40 absorbed by the light-absorbing material 112 and the internal light 30 emitted by the light-emitting layer, the diameter of the light-absorbing material 112 is selected by considering the diameter of the protrusion structure 110a. That is, the diameter of the light-absorbing material 112 should be large enough to absorb the external light 40 and simultaneously small so that the internal light 30 emitted from the light-emitting layer is not excessively intercepted. For example, the diameter of the light-absorbing material 112 may be between 1/100 and 1/2, preferably, between 1/5 and 1/3, of the diameter of the protrusion structure 110a.

Figure 5:
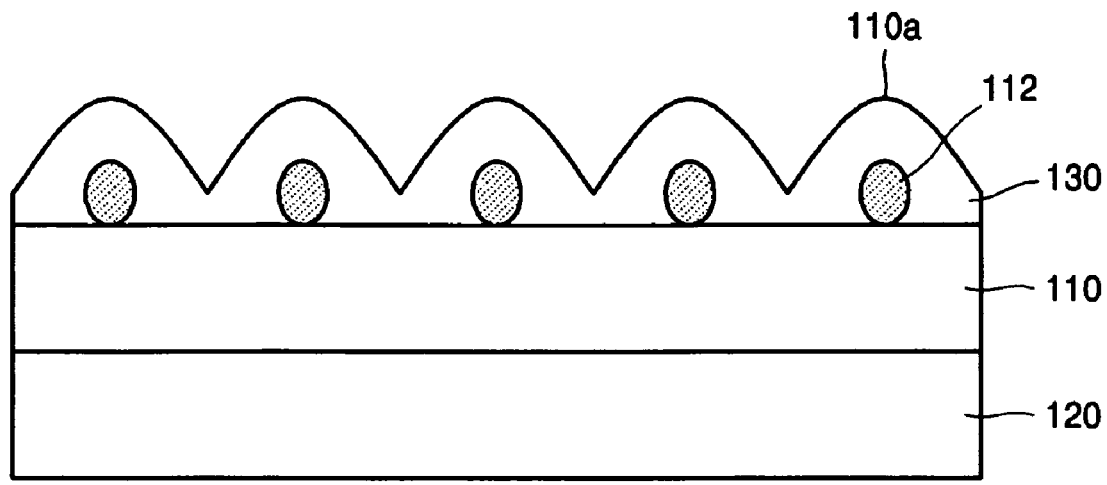
FIG. 5 illustrates a structure of a one-way transparent optical system according to an embodiment of the present invention.

FIG. 5 illustrates an example in which an antireflective and glare-preventing layer is formed on a display device, using an one-way transparent optical system according to the present invention. Referring to FIG. 5, the antireflective and glare-preventing layer has a structure in which the one-way transparent optical system shown in FIG. 4 is arranged two-dimensionally. As described above, external light is refracted by a protrusion structure 110a having the shape of a convex lens and absorbed by a light-absorbing material 112. However, most internal light that has been generated in a display device 120 and has passed through a transparent substrate 110, passes between the light-absorbing materials 112. In this case, only with a very simple structure, most external light can be absorbed and most internal light can pass. Thus, when adopting the one-way transparent optical system in a display device, the brightness of the display device can be increased by nearly 80% and glare due to reflected light hardly occurs.

When reducing the size of the protrusion structure 110a by micrometers (for example, 0.1 to 100 μm), the protrusion structure 110a refracts the external light 40 to make the reflected external light 40 aim at the light-absorbing material 112 and simultaneously, scatters part of the external light 40. Thus, glare that occurs when the external light 40 is reflected on the surface of the protrusion structure 110a can be reduced. In this case, an interval between the protrusion structures 110a and their sizes may be non-uniform so that an interference pattern is not formed by interference between reflected lights.

Figure 6:
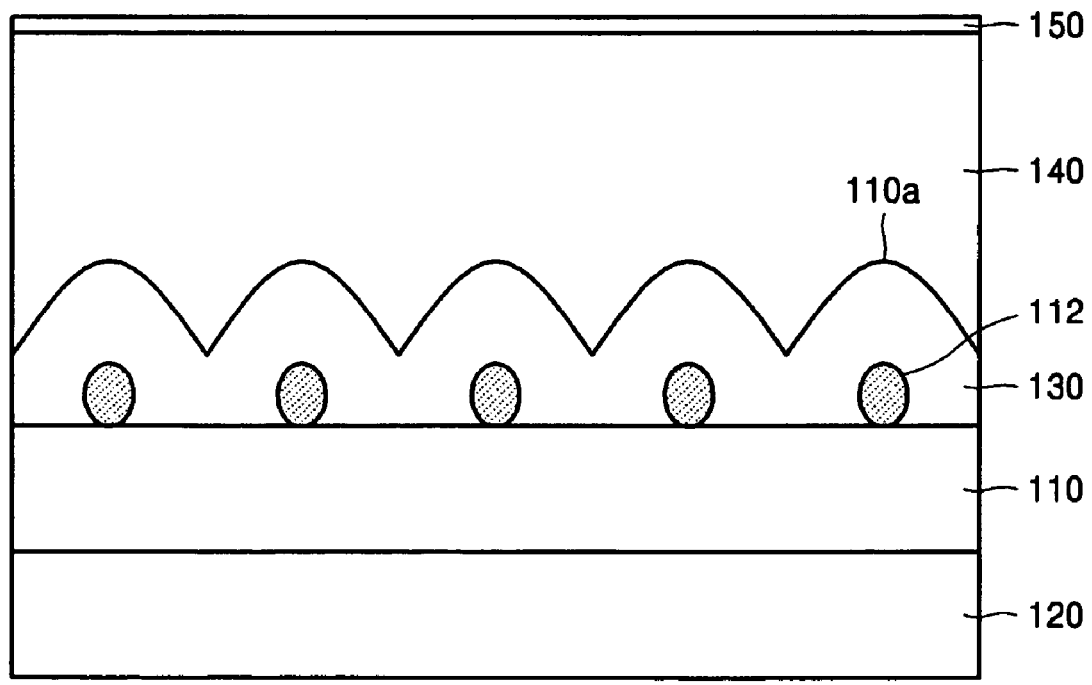
FIG. 6 illustrates a structure of a one-way transparent optical system according to another embodiment of the present invention.

FIG. 6 illustrates an one-way transparent optical system according to another embodiment of the present invention. Referring to FIG. 6, in the one-way transparent optical system, a plurality of protrusion structures 110a having the shape of a convex lens formed of a transparent optical material 130 are formed on an upper surface of a transparent substrate 110, and light-absorbing materials 112 are disposed near a corresponding focusing region of the protrusion structures 110a. The transparent substrate 110 is disposed on a display device 120 such as organic EL. In addition, a light transmission layer 140 is formed on the plurality of protrusion structures 110a, and an antireflective coating 150 is formed on the surface of the light transmission layer 140. Here, the light transmission layer 140 should have a lower refractive index than that of the transparent optical material 130 used in forming the protrusion structures 110a so that the protrusion structures 110a refract incident light toward the light-absorbing materials 112. In this case, owing to the antireflective coating 150, reflection on the surface of the light transmission layer 140 can be nearly eliminated. Most external incident light that has passed through the light transmission layer 140 without being reflected on the surface of the light transmission layer 140, is refracted by the protrusion structures 110a and then absorbed by the light-absorbing material 112. In this case, for the above-described reason, the arrangement of the protrusion structures 110a may be non-uniform.

FIGS. 7A through 7G sequentially illustrate a method of fabricating a one-way transparent optical system having the above-described structure. First, referring to FIGS. 7A and 7B, emulsion, for example, silver halide (AgX) 160 is coated on a transparent substrate 110. Here, the transparent substrate 110 may be formed by emulsion polymerizing a transparent material such as methylmethacrylate (MMA). However, formation of the transparent substrate 110 is not limited to this, and a different light transmission material such as glass may be used. A silver halide (AgX) as a photosensitive material used in a black and white photographic film is one of the compounds formed between silver and one of the halogens, notably silver bromide (AgBr) or silver chloride (AgCl). Alternatively, AgBr and AgCl may be combined and a small speck of silver iodide (AgI) may be added to a mixture of AgBr and AgCl. In general, since it is not easy to directly coat AgX on the transparent substrate 110 to a small thickness, AgX is mixed with a gelatine emulsion and its mixture is coated on the transparent substrate 110.

Figure 7A:
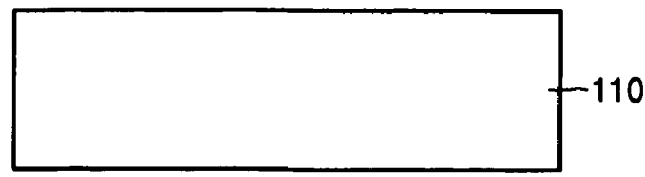
FIGS. 7A through 7G are cross-sectional views illustrating a method of fabricating an one-way transparent optical system according to the present invention.
Figure 7B:
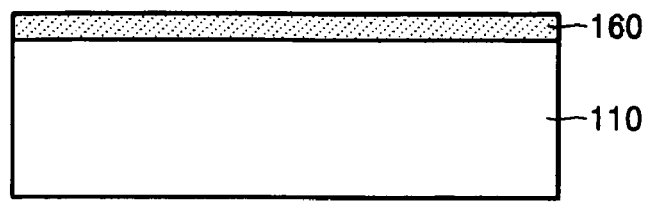
Figure 7C:
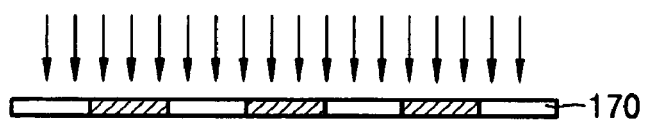
Figure 7C:
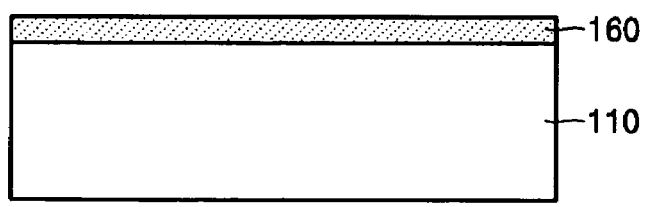
Figure 7D:
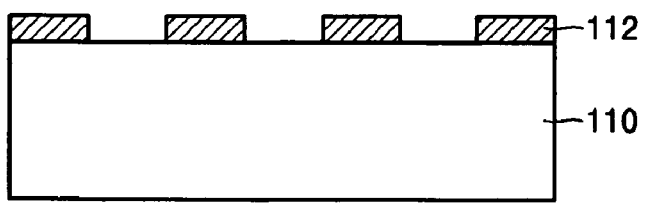

After that, referring to FIG. 7C, a mask 170 in which predetermined patterns are formed is aligned over the transparent substrate 110 on which AgX 160 is coated, and then, light is vertically irradiated toward AgX 160. Here, a visible ray or ultraviolet ray may be used as light. When AgX absorbs light, energy in a silver halide crystal increases, electrons that can move to the inside of the crystal are produced, and silver ions $Ag^+$ in the crystal capture the electrons and are reduced to Ag. Thus, only a portion of AgX 160 exposed by light that has passed through the mask 170 is reduced to Ag. As a result, a latent image having the same shape as the patterns of the mask 170 is formed on AgX 160.

Next, the latent image is developed using a general developing method. In other words, light-exposed AgX is reduced to black metallic silver using a developer. The reduced black metallic silver serves as a light-absorbing material. Methol, hydroquinon, or the like may be used as the developer. Since the developer is used to reduce only the latent image exposed to light in black, an unexposed portion still remains as AgX that may react with light. Since remaining AgX can be always changed by light, unexposed AgX is converted into soluble silver salts using a fixer. For example, sodium thiosulphite, ammonium thiosulphite, or the like may be used as the fixer. In this case, a developer that remains on the transparent substrate 110 etc. is neutralized using a neutralizer before performing a fixing operation so that the fixing operation using the fixer can be more effectively performed. Since the developer is alkaline, acid chemicals such as glacial acetic acid are used as the neutralizer. After the fixing operation is completed, a cleaning and drying operation is performed to remove the remaining chemicals and silver salts. Then, referring to FIG. 7D, the plurality of light-absorbing materials 112 formed of black metallic silver remain on the transparent substrate 110 as a predetermined pattern.

Figure 7E:
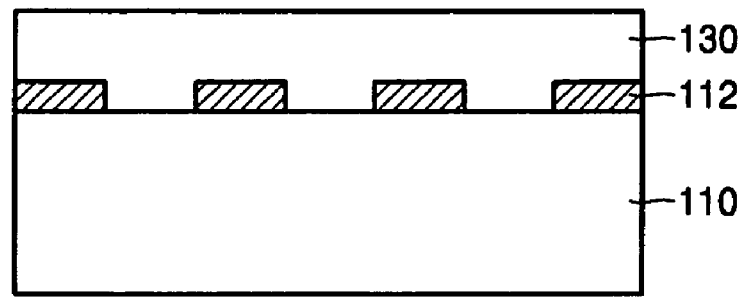
Figure 7F:
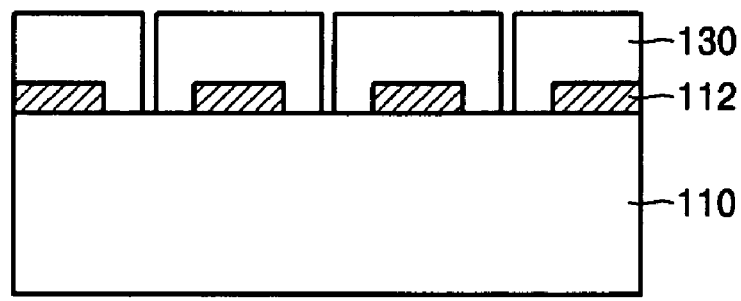

When the light-absorbing materials 112 are formed on the transparent substrate 110, referring to FIG. 7E, the transparent optical material 130 is formed on the transparent substrate 110 on which the light-absorbing structures 112 are formed, to a thickness of about 2-3 μm, for example. Here, PMMA which is the same as the transparent substrate 110, for example, may be used as the transparent optical material 130. However, the transparent optical material 130 is not limited to PMMA and a different transparent material substantially having the same refractive index as that of the transparent substrate 110 may be used. Then, the transparent optical material 130 is patterned so that a plurality of protrusion structures having a rectangular parallelepiped shape are formed. FIG. 7F illustrates the protrusion structures having a rectangular parallelepiped shape formed on the transparent substrate 110. The width of each of the protrusion structures may be about 5 μm, for example. Here, referring to FIG. 7F, corresponding light-absorbing materials 112 are disposed in the center of lower surfaces of the protrusion structures having a rectangular parallelepiped shape.

Figure 7G:
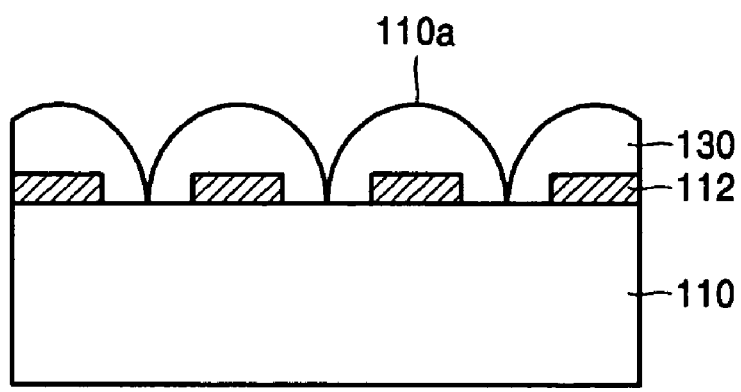

Last, referring to FIG. 7G, the patterned protrusion structures having a rectangular parallelepiped shape are melted and cooled using a well-known bake and reflow process, thereby forming protrusion structures 110a having a convex lens shape. For example, when heating the protrusion structures having a rectangular parallelepiped shape at a predetermined temperature using a hot plate, halogen lamp or laser beam, the protrusion structures having a rectangular parallelepiped shape are melted and gradually changed into a hemispherical shape, for example. In this case, a heating temperature may be selected according to the types and thicknesses of materials. When the protrusion structures having a rectangular parallelepiped shape are completely melted and deformed into the protrusion structures 110a having a hemispherical convex lens shape, the protrusion structures are cooled and hardened. Then, the protrusion structures 110a having a convex lens shape refract incident light toward a corresponding light-absorbing material of the light-absorbing materials 112.

When forming the light-absorbing materials 112 using the above-described method, heat is not applied in forming the light-absorbing material 112 so that a process of manufacturing is very simple and process time and costs can be reduced. In addition, in the method for fabricating an one-way transparent optical system, a very thin light-absorbing material having a thickness of several to several tens of nm can be obtained. Thus, it is possible to obtain the hemispherical protrusion structures 110a having a nearly complete shape in a subsequent process of forming the protrusion structures 110a.

In forming the light-absorbing materials 112, an interval between patterns of the light-absorbing materials 112 formed on an upper surface of the transparent substrate 110 may be non-uniform such that the interval and size of the finally-formed protrusion structures 110a having a lens shape may be non-uniform. In this case, as previously described, an interference pattern that may be formed by interference between lights reflected on the surface of the protrusion structures 110a is not formed.

The one-way transparent optical system has the same structure as that of the one-way transparent optical system shown in FIG. 5. In this structure, in order to fabricate the one-way transparent optical system shown in FIG. 6, the light transmission layer 140 and the antireflective coating 150 can be consecutively formed on the protrusion structures 110a having a lens shape.

As described above, in the method for fabricating an one-way transparent optical system according to the present invention, external light can be effectively intercepted and an internal light efficiency can be nearly maintained without loss. Thus, when using a display device, glare and a decrease in contrast can be effectively prevented and the brightness of the display device can be increased by nearly 80% compared to the prior art using a polarizer. In addition, since a structure is simple and high-priced materials are not used, manufacturing costs can be reduced compared to the prior art using a polarizer.

Furthermore, since the present invention can be effectively applied regardless of the internal structure of a light-emitting element having any shape including an organic electroluminescent (EL), process and design are advantageous.

In addition, the present invention can be applied to a variety of fields such as illumination or optical design, etc., which requires a transparent layer for selectively intercepting light according to a direction, without design changes, as well as the display device.

In addition, since a heating process is not needed in forming light-absorbing materials, a process is very simple and process time and costs can be reduced. In addition, since a very thin light-absorbing material can be obtained, hemispherical protrusion structures having a more complete shape can be easily obtained.

While the present invention has been particularly shown and described with reference to exemplary embodiments thereof, it will be understood by those skilled in the art that various changes in form and details may be made therein without departing from the spirit and scope of the invention as defined by the following claims.

What is claimed is:

1. A method of fabricating a one-way transparent optical system, the method comprising:
    forming a silver halide on a transparent substrate;
    aligning a mask in which a predetermined pattern is formed, on the transparent substrate and exposing the silver halide using the mask;
    developing and fixing the exposed silver halide and forming a plurality of light-absorbing materials on the transparent substrate; and
    after the forming of the light-absorbing materials, forming protrusion structures having a shape for refracting incident light toward a corresponding light-absorbing material of the light-absorbing materials, on the transparent substrate on which the light-absorbing materials are formed,
    wherein the light-absorbing materials are disposed near focusing areas of the protrusion structures.

2. The method of claim 1, wherein the silver halide includes at least one of silver bromide (AgBr) or silver chloride (AgCl).

3. The method of claim 1, wherein the forming of the silver halide on the transparent substrate is performed by mixing the silver halide with gelatine emulsion and coating its mixture on the transparent substrate.

4. The method of claim 1, wherein the forming of the plurality of light-absorbing materials on the transparent substrate comprises:
    developing step of reducing the light-exposed silver halide into black metallic silver using a developer;
    fixing step of converting an unexposed silver halide into silver salts using a fixer; and
    cleaning, eliminating and drying the remaining developer, the fixer, and the silver salts.

5. The method of claim 4, before the fixing step, farther comprising neutralizing the remaining alkaline developer using acid chemicals.

6. The method of claim 4, wherein the reduced black metallic silver serves as a light-absorbing material.

7. The method of claim 1, wherein the forming of the protrusion structures comprises:
    stacking a transparent optical material on the transparent substrate on which the light-absorbing materials are formed;
    patterning the transparent optical material to form a plurality of protrusion structures; and
    melting and cooling the patterned protrusion structures to form protrusion structures having a convex lens shape.

8. The method of claim 7, wherein the light-absorbing materials are disposed in the center of lower surfaces of the patterned protrusion structures.

9. The method of claim 7, wherein a refractive index of the transparent optical material is substantially the same as a refractive index of the transparent substrate.

10. The method of claim 7, wherein the melting and cooling of the protrusion structures is performed using a bake and reflow process.

11. The method of claim 1, wherein a light transmission layer and an antireflective layer are additionally and consecutively formed on the protrusion structures.

12. The method of claim 11, wherein the refractive index of the light transmission layer is lower than refractive indices of the protrusion structures.

13. The method of claim 1, wherein an interval between the light-absorbing materials is not uniform.

14. The method of claim 1, wherein the protrusion structures have a shape of a convex lens.

* * * * *